United States Patent
Sato

(10) Patent No.: US 11,958,746 B2
(45) Date of Patent: Apr. 16, 2024

(54) HYDROCARBON REFORMING CATALYST AND HYDROCARBON REFORMING APPARATUS

(71) Applicant: Murata Manufacturing Co., Ltd., Nagaokakyo (JP)

(72) Inventor: Hideto Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 616 days.

(21) Appl. No.: 17/128,601

(22) Filed: Dec. 21, 2020

(65) Prior Publication Data
US 2021/0107787 A1    Apr. 15, 2021

Related U.S. Application Data

(63) Continuation of application No. PCT/JP2019/005789, filed on Feb. 18, 2019.

(30) Foreign Application Priority Data

Jul. 9, 2018  (JP) .................................. 2018-129685

(51) Int. Cl.
*C01B 3/40* (2006.01)
*B01J 21/06* (2006.01)
(Continued)

(52) U.S. Cl.
CPC ................ *C01B 3/40* (2013.01); *B01J 21/20* (2013.01); *B01J 2523/25* (2013.01);
(Continued)

(58) Field of Classification Search
CPC .............. C01B 3/40; C01B 2203/0233; C01B 2203/0238; C01B 2203/0244;
(Continued)

(56) References Cited

U.S. PATENT DOCUMENTS

2009/0229239 A1* 9/2009 Keller ...................... F02C 6/04
48/198.1
2009/0264283 A1* 10/2009 Yang .................. B01D 53/9454
502/303
(Continued)

FOREIGN PATENT DOCUMENTS

CN        1602997 A    4/2005
CN      102658135 A    9/2012
(Continued)

OTHER PUBLICATIONS

B. de Caprariis et al.; "Rh, Ru and Pt ternary perovskites type oxides BaZr(1-x)MexO3 for methane dry reforming"; Applied Catalysis A: General 517 (2016), pp. 47-55.
(Continued)

*Primary Examiner* — Prem C Singh
*Assistant Examiner* — Juan C Valencia
(74) *Attorney, Agent, or Firm* — Arentfox Shiff LLP

(57) ABSTRACT

A hydrocarbon reforming catalyst for producing a synthesis gas containing hydrogen and carbon monoxide from a hydrocarbon-based gas, the hydrocarbon reforming catalyst containing a complex oxide having a perovskite structure including at least Ba, Zr, and Ru; and a hydrocarbon reforming apparatus that includes the hydrocarbon-reforming catalyst.

15 Claims, 2 Drawing Sheets

(51) Int. Cl.
*B01J 21/20* (2006.01)
*B01J 23/46* (2006.01)
*B01J 29/08* (2006.01)

(52) U.S. Cl.
CPC ........ *B01J 2523/36* (2013.01); *B01J 2523/48* (2013.01); *B01J 2523/821* (2013.01); *C01B 2203/0233* (2013.01); *C01B 2203/0238* (2013.01); *C01B 2203/0244* (2013.01); *C01B 2203/0811* (2013.01); *C01B 2203/1041* (2013.01); *C01B 2203/1235* (2013.01)

(58) Field of Classification Search
CPC ..... C01B 2203/0811; C01B 2203/1041; C01B 2203/1235; C01B 2203/1064; B01J 21/20; B01J 2523/25; B01J 2523/36; B01J 2523/48; B01J 2523/821; B01J 23/002; B01J 23/63; B01J 35/002; B01J 2523/00; B01J 23/58; Y02P 20/52
See application file for complete search history.

(56) References Cited

U.S. PATENT DOCUMENTS

2009/0269264 A1    10/2009  Saito et al.

2015/0376005 A1*   12/2015  Said ................... B01J 19/2415
                                                        422/162

FOREIGN PATENT DOCUMENTS

| JP | S63302950 A | 12/1988 |
|----|-------------|---------|
| JP | H06315634 A | 11/1994 |
| JP | H08231204 A | 9/1996 |
| JP | H09168740 A | 6/1997 |
| JP | 2002346341 A | 12/2002 |
| JP | 2005046808 A | 2/2005 |
| JP | 2006346598 A | 12/2006 |
| JP | 2013237049 A | 11/2013 |
| JP | 2015136668 A | 7/2015 |
| WO | 2008084785 A1 | 7/2008 |

OTHER PUBLICATIONS

International Search Report issued for PCT/JP2019/005789, dated May 7, 2019.

Written Opinion of the International Searching Authority issued for PCT/JP2019/005789, dated May 7, 2019.

Schupp-Niewa, B. et al.; "Crystal Structure of $Ba_3ZrRu_2O_9$—a New 6H-$(cch)_2$ Perovskite"; Z. Anorg. Allg. Chem., Feb. 27, 2006, vol. 632, No. 4, pp. 572-576.

\* cited by examiner

US 11,958,746 B2

HYDROCARBON REFORMING CATALYST AND HYDROCARBON REFORMING APPARATUS

CROSS REFERENCE TO RELATED APPLICATIONS

The present application is a continuation of International application No. PCT/JP2019/005789, filed Feb. 18, 2019, which claims priority to Japanese Patent Application No. 2018-129685, filed Jul. 9, 2018, the entire contents of each of which are incorporated herein by reference.

FIELD OF THE INVENTION

The present invention relates to a hydrocarbon reforming catalyst used to obtain a synthesis gas containing hydrogen and carbon monoxide from a hydrocarbon-based gas, and a hydrocarbon reforming apparatus for producing a synthesis gas containing hydrogen and carbon monoxide from a gas containing a hydrocarbon.

BACKGROUND OF THE INVENTION

A method for obtaining a synthesis gas containing hydrogen and carbon monoxide from a hydrocarbon-based gas using a catalyst is known. As the catalyst used in a reforming reaction of the hydrocarbon-based gas, a nickel-based catalyst in which nickel is supported on a substrate such as alumina, a ruthenium-based catalyst in which ruthenium is supported (see Patent Document 1), and a rhodium-based catalyst in which rhodium is supported on a substrate such as alumina (see Patent Document 2) are known.

Furthermore, for the purpose of suppressing carbon deposition and improving activity at a low temperature, catalysts in which rhodium, cobalt, and nickel are supported as active components on a support including perovskite type compounds such as lanthanum aluminate, strontium titanate, and barium titanate are known (see Patent Document 3).

As a general method for producing a metal supported catalyst, an impregnation method is used in which an oxide as the support is immersed in a solution of a metal salt or the like, and then an active metal is dispersed on the surface of the support by heat treatment (Patent Documents 1 to 3).

Since the support component is required to have high thermal stability and strength, the support component is sufficiently sintered by heat treatment at a high temperature, whereas the supported metal needs to maintain dispersibility in order to obtain high activity. Therefore, in order to minimize aggregation in the heat treatment step, the supported metal is fixed on the support by heat treatment at a relatively low temperature by using a production step that is different from synthesis of the support as in the above impregnation method.

Although the catalyst produced by the impregnation method can maintain high metal dispersibility, the impregnation step of supporting the metal component is required in addition to a synthesis step of the support component. Moreover, since the metal component is fixed by the heat treatment at a relatively low temperature, a bond between the metal and the support is weak and causes a problem in that the activity decreases due to carbon deposition.

Therefore, as a method for producing a catalyst without the impregnation step, a method for synthesizing a complex oxide containing $BaNiY_2O_5$ by solid phase synthesis to improve the dispersibility of the Ni component is proposed (Patent Document 4).

Patent Document 1: Japanese Patent Application Laid-Open No. H08-231204
Patent Document 2: Japanese Patent Application Laid-Open No. H09-168740
Patent Document 3: Japanese Patent Application Laid-Open No. 2006-346598
Patent Document 4: Japanese Patent Application Laid-Open No. 2015-136668

SUMMARY OF THE INVENTION

In the case of the catalyst described in Patent Document 4, carbon deposition can be suppressed, but it cannot be said that the activity is sufficiently high, and there is room for improvement.

The present invention solves the above problem, and an object of the present invention is to provide a hydrocarbon reforming catalyst having high activity, and a hydrocarbon reforming apparatus including such a hydrocarbon reforming catalyst.

The hydrocarbon reforming catalyst of the present invention is a hydrocarbon reforming catalyst for producing a synthesis gas containing hydrogen and carbon monoxide from a hydrocarbon-based gas, the hydrocarbon reforming catalyst containing a complex oxide having a perovskite structure including at least Ba, Zr, and Ru.

A molar ratio of the Ru to the Ba may be 0.07 or more.
The molar ratio of the Ru to the Ba may be 0.41 or less.
The perovskite structure may further include Y.
A molar ratio of the Y to the Ba may be 0.1 or more.
The molar ratio of the Y to the Ba may be 0.1 to 0.5.
Furthermore, the molar ratio of the Y to the Ba may be 0.2 to 0.4.
A molar ratio of the Y to the Zr may be 0.1 or more.
The molar ratio of the Y to the Zr may be 0.1 to 1.
Furthermore, the molar ratio of the Y to the Zr may be 0.25 to 0.67.
A molar ratio of a total amount of the Zr and the Y to the Ba may be 0.68 to 1.5.

The hydrocarbon reforming apparatus for treating a gas containing at least a hydrocarbon of the present invention includes a pipe configured such that the gas containing the at least the hydrocarbon can flow, a heater positioned to heat the gas as the gas flows through the pipe, and a hydrocarbon-reforming catalyst disposed so as to contact the gas while the gas is inside the pipe, the hydrocarbon-reforming catalyst containing a complex oxide having a perovskite structure including at least Ba, Zr, and Ru.

In the hydrocarbon reforming apparatus, a molar ratio of the Ru to the Ba may be 0.07 to 0.41.

A gas to be treated containing at least the hydrocarbon and a sulfur component may flow through the pipe, and the perovskite structure may further include Y.

The hydrocarbon reforming apparatus may further include a hydrocarbon supply source that is disposed on an upstream side of the pipe and is constructed to supply the hydrocarbon.

Furthermore, the hydrocarbon reforming apparatus may further include a hydrogen extraction outlet disposed on a downstream side of the pipe for extraction of hydrogen obtained by reforming the hydrocarbon.

The hydrocarbon reforming catalyst of the present invention exhibits high catalytic activity during the reforming of a hydrocarbon-based gas and thus allows the hydrocarbon-based gas to be efficiently reformed.

DETAILED DESCRIPTION OF THE INVENTION

An embodiment of the present invention is presented below to specifically describe features of the present invention.

The hydrocarbon reforming catalyst according to the present invention is a catalyst for producing a synthesis gas containing hydrogen and carbon monoxide from hydrocarbon-based gases, and satisfies the following requirements (hereinafter, referred to as requirements of the present invention). That is, the hydrocarbon reforming catalyst according to the present invention contains a complex oxide having a perovskite structure including at least Ba, Zr, and Ru.

As the hydrocarbon-based gas that is the gas to be treated, for example, propane gas containing propane as a main component or natural gas containing methane as a main component can be used. Furthermore, a hydrocarbon-based gas obtained by vaporization of liquid hydrocarbons such as gasoline, kerosene, methanol, and ethanol can also be used.

A reaction in which the synthetic gas containing hydrogen and carbon monoxide is produced from the hydrocarbon-based gas is described by taking steam reforming of propane gas as an example. The steam reforming of propane gas is represented by the following formula (1)

$$C_3H_8 + 3H_2O \rightarrow 7H_2 + 3CO \tag{1}$$

However, the method for producing the synthesis gas containing hydrogen and carbon monoxide from the hydrocarbon-based gas is not limited to the steam reforming, and other methods such as carbon dioxide reforming and partial oxidation reforming may also be used.

Figure 1:
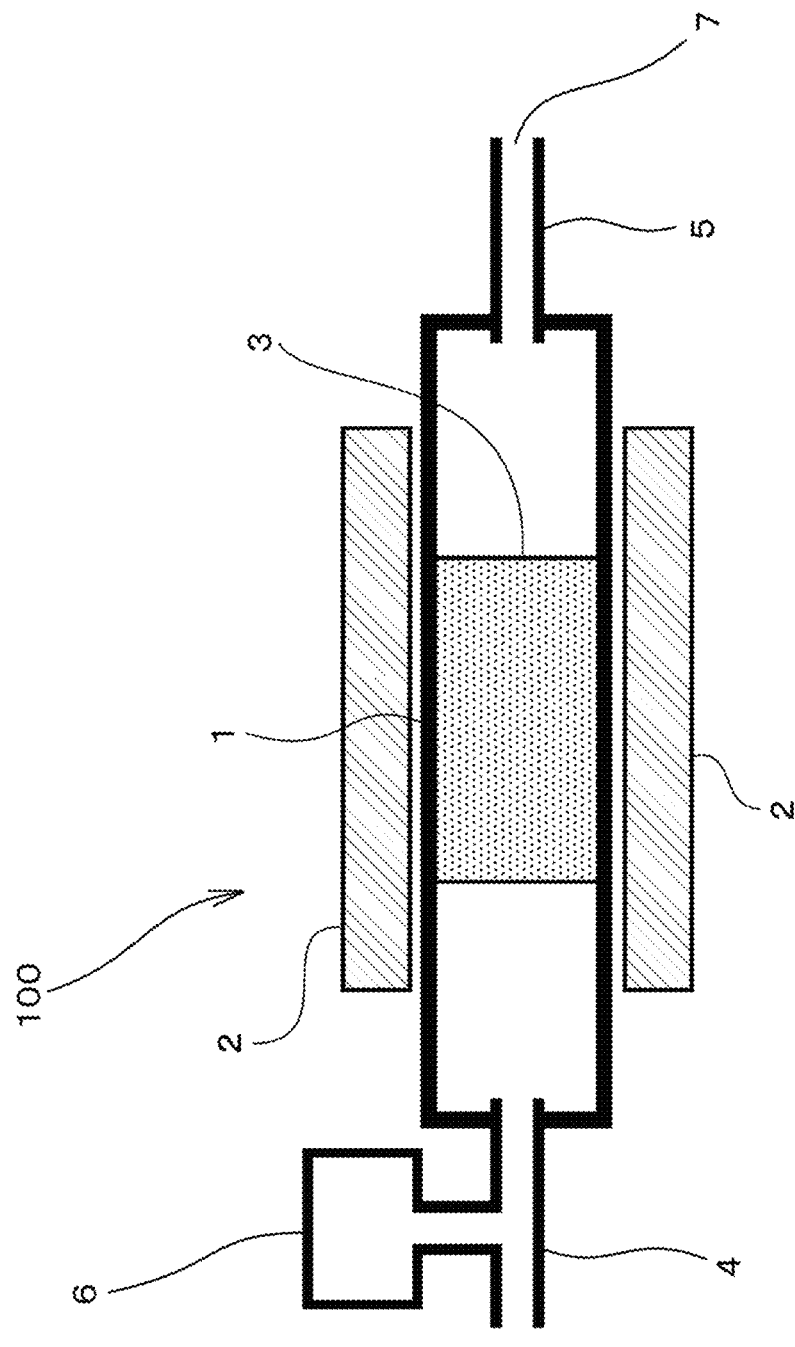
FIG. 1 shows a schematic configuration of a hydrocarbon reforming apparatus.

FIG. 1 shows a schematic configuration of a hydrocarbon reforming apparatus 100 for producing a synthesis gas containing hydrogen and carbon monoxide from a gas to be treated containing at least a hydrocarbon. The hydrocarbon reforming apparatus 100 includes a pipe 1 through which the gas to be treated flows, a heating section 2 that heats the gas to be treated flowing through the pipe 1, and a hydrocarbon reforming catalyst 3 positioned inside the pipe 1 so as to come into contact with the gas to be treated. The hydrocarbon reforming catalyst 3 is a catalyst that satisfies the requirements of the present invention and contains a complex oxide having a perovskite structure including at least Ba, Zr, and Ru.

A gas supply pipe 4 is connected on an upstream side of the pipe 1. Hydrocarbon is supplied from a hydrocarbon supply source 6 to the gas supply pipe 4.

However, the hydrocarbon supply source 6 may be provided at a stage preceding the gas supply pipe 4. Furthermore, the hydrocarbon supplied from the hydrocarbon supply source 6 may contain other components.

A gas discharge pipe 5 for discharge of the synthesis gas containing hydrogen and carbon monoxide obtained by reforming in the pipe 1 is connected on a downstream side of the pipe 1. The gas discharge pipe 5 is provided with a hydrogen extraction outlet 7 and is configured such that hydrogen contained in the synthesis gas can be extracted from the gas discharge pipe 5. For example, a CO shift converter may be provided inside the gas discharge pipe 5 to remove the carbon monoxide contained in the synthesis gas, and hydrogen may be extracted from the hydrogen extraction outlet 7.

Example 1

$BaCO_3$, $ZrO_2$, and $RuO_2$ were prepared as materials for the hydrocarbon reforming catalyst, weighed so that the molar ratio was Ba:Zr:Ru=1.00:1.00:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 1.

The hydrocarbon reforming catalysts of Example 1 described above and Examples 2 to 16 described later are catalysts that satisfy the requirements of the present invention.

Example 2

$BaCO_3$, $ZrO_2$, $Y_2O_3$, and $RuO_2$ were prepared as materials for the hydrocarbon reforming catalyst, weighed so that the molar ratio was Ba:Zr:Y:Ru=1.00:0.90:0.10:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 2.

Example 3

$BaCO_3$, $ZrO_2$, $Y_2O_3$, and $RuO_2$ were prepared as materials for a hydrocarbon reforming catalyst, weighed so that the molar ratio was Ba:Zr:Y:Ru=1.00:0.80:0.20:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 3.

Example 4

$BaCO_3$, $ZrO_2$, $Y_2O_3$, and $RuO_2$ were prepared as materials for a hydrocarbon reforming catalyst, weighed so that the molar ratio was Ba:Zr:Y:Ru=1.00:0.70:0.30:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 4.

Example 5

$BaCO_3$, $ZrO_2$, $Y_2O_3$, and $RuO_2$ were prepared as materials for the hydrocarbon reforming catalyst, weighed so that the molar ratio was Ba:Zr:Y:Ru=1.00:0.60:0.40:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 5.

Example 6

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.50:0.50:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 6.

Example 7

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.70:0.30:0.04, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 7.

Example 8

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.70:0.30:0.06, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 8.

Example 9

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.70:0.30:0.12, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 9.

Example 10

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.70:0.30:0.21, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 10.

Example 11

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.70:0.30:0.41, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 11.

Example 12

BaCO$_3$, ZrO$_2$, and RuO$_2$ were prepared as materials for the hydrocarbon reforming catalyst, weighed so that the molar ratio was Ba:Zr:Ru=1.00:1.00:0.04, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 12.

Example 13

BaCO$_3$, ZrO$_2$, and RuO$_2$ were prepared as materials for the hydrocarbon reforming catalyst, weighed so that the molar ratio was Ba:Zr:Ru=1.00:1.00:0.21, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 13.

Example 14

BaCO$_3$, ZrO$_2$, and RuO$_2$ were prepared as materials for the hydrocarbon reforming catalyst, weighed so that the molar ratio was Ba:Zr:Ru=1.00:1.00:0.41, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 14.

Example 15

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:1.05:0.45:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 15.

Example 16

BaCO$_3$, ZrO$_2$, Y$_2$O$_3$, and RuO$_2$ were prepared as materials for the hydrocarbon reforming catalyst, weighed so that the molar ratio was Ba:Zr:Y:Ru=1.00:0.48:0.20:0.07, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Example 16.

Comparative Example 1

$BaCO_3$ and $ZrO_2$ were prepared as materials for the hydrocarbon reforming catalyst, weighed so that the molar ratio was Ba:Zr=1.00:1.00, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Comparative Example 1. The hydrocarbon reforming catalyst of Comparative Example 1 is a catalyst that does not satisfy the requirements of the present invention described above.

Comparative Example 2

$BaCO_3$, $ZrO_2$, and $RuO_2$ were prepared as materials for the hydrocarbon reforming catalyst, weighed so that the molar ratio was Ba:Zr:Ru=1.00:1.00:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the obtained granules were fired in air at 500° C. for 1 hour to obtain a hydrocarbon reforming catalyst of Comparative Example 2. The hydrocarbon reforming catalyst of Comparative Example 2 is a catalyst that does not satisfy the requirements of the present invention described above.

Comparative Example 3

$BaCO_3$, $ZrO_2$, $Y_2O_3$, and $RuO_2$ were prepared as materials for the hydrocarbon reforming catalyst, weighed so that the molar ratio was Ba:Zr:Y:Ru=1.00:0.70:0.30:0.08, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 500° C. for 1 hour to obtain a hydrocarbon reforming catalyst of Comparative Example 3. The hydrocarbon reforming catalyst of Comparative Example 3 is a catalyst that does not satisfy the requirements of the present invention described above, and temperature conditions during firing are different from the temperature conditions when the hydrocarbon reforming catalyst of Example 4 was produced.

Comparative Example 4

$BaCO_3$, $ZrO_2$, $Y_2O_3$, and NiO were prepared as materials for the hydrocarbon reforming catalyst, weighed so that the molar ratio was Ba:Zr:Y:Ni=1.00:0.70:0.30:0.04, and wet-mixed with pebbles, water, and a binder to obtain a mixture. The obtained mixture was dried in an oven at a temperature of 120° C., and then pulverized and classified to obtain granules having a size of 1.5 mm to 2.5 mm. After that, the granular sample was fired in air at 1000° C. for 1 hour to obtain a hydrocarbon reforming catalyst of Comparative Example 4. The hydrocarbon reforming catalyst of Comparative Example 4 is a catalyst that does not satisfy the requirements of the present invention described above.

Comparative Example 5

A powder of $\gamma$-$Al_2O_3$ as a support was impregnated with an aqueous solution of Ru chloride so that the amount of Ru was 5% by weight, and heat-treated in air at 600° C. for 1 hour. A powder obtained by the heat treatment was pressed into pellets having a thickness of 1 mm to 2 mm to obtain a hydrocarbon reforming catalyst of Comparative Example 5. The hydrocarbon reforming catalyst of Comparative Example 5 is a catalyst that does not satisfy the requirements of the present invention described above.

Comparative Example 6

The hydrocarbon reforming catalyst of Comparative Example 5 was further heat-treated in air at 1000° C. for 1 hour to obtain a hydrocarbon reforming catalyst of Comparative Example 6. The hydrocarbon reforming catalyst of Comparative Example 6 is a catalyst that does not satisfy the requirements of the present invention described above.

<Determination of Crystal Phase>

The hydrocarbon reforming catalysts of Examples 1 to 16 and Comparative Examples 1 to 6 described above were pulverized in a mortar, and the crystal phases were determined by powder XRD measurement. In the powder XRD measurement, Cu—K$\alpha$1 was used as X-rays.

Table 1 shows the determined crystal phases and compositions of the hydrocarbon reforming catalysts of Examples 1 to 16 and Comparative Examples 1 to 6.

TABLE 1

| Catalyst | Crystal phase | Molar ratio | | | |
| --- | --- | --- | --- | --- | --- |
| | | Ba | Zr | Y | Ru |
| Example 1 | Perovskite | 1.00 | 1.00 | — | 0.08 |
| Example 2 | Perovskite | 1.00 | 0.90 | 0.10 | 0.08 |
| Example 3 | Perovskite, $Y_2O_3$ | 1.00 | 0.80 | 0.20 | 0.08 |
| Example 4 | Perovskite, $Y_2O_3$ | 1.00 | 0.70 | 0.30 | 0.08 |
| Example 5 | Perovskite, $BaCO_3$, $Y_2O_3$ | 1.00 | 0.60 | 0.40 | 0.08 |
| Example 6 | Perovskite, $BaCO_3$, $Y_2O_3$ | 1.00 | 0.50 | 0.50 | 0.08 |
| Example 7 | Perovskite, $BaCO_3$, $Y_2O_3$ | 1.00 | 0.70 | 0.30 | 0.04 |
| Example 8 | Perovskite, $BaCO_3$, $Y_2O_3$ | 1.00 | 0.70 | 0.30 | 0.06 |
| Example 9 | Perovskite, $BaCO_3$, $Y_2O_3$ | 1.00 | 0.70 | 0.30 | 0.12 |
| Example 10 | Perovskite, $BaCO_3$, $Y_2O_3$ | 1.00 | 0.70 | 0.30 | 0.21 |
| Example 11 | Perovskite, $BaCO_3$, $Y_2O_3$ | 1.00 | 0.70 | 0.30 | 0.41 |
| Example 12 | Perovskite, $BaCO_3$ | 1.00 | 1.00 | — | 0.04 |
| Example 13 | Perovskite, $BaCO_3$ | 1.00 | 1.00 | — | 0.21 |
| Example 14 | Perovskite, $BaCO_3$ | 1.00 | 1.00 | — | 0.41 |
| Example 15 | Perovskite, $Y_2O_3$ | 1.00 | 1.05 | 0.45 | 0.08 |
| Example 16 | Perovskite, $BaCO_3$ | 1.00 | 0.48 | 0.20 | 0.07 |
| Comparative Example 1 | Perovskite, $BaCO_3$ | 1.00 | 1.00 | — | — |
| Comparative Example 2 | $BaCO_3$, $ZrO_2$, $RuO_2$ | 1.00 | 1.00 | — | 0.08 |
| Comparative Example 3 | $BaCO_3$, $ZrO_2$, $RuO_2$, $Y_2O_3$ | 1.00 | 0.70 | 0.30 | 0.08 |
| Comparative Example 4 | Perovskite, $BaNiY_2O_5$ | — | — | — | — |
| Comparative Example 5 | $Al_2O_3$, $RuO_2$ | — | — | — | — |
| Comparative Example 6 | $Al_2O_3$, $RuO_2$ | — | — | — | — |

As for all of the hydrocarbon reforming catalysts of Examples 1 to 16, crystal phases having a perovskite structure were observed, and heterogeneous phases such as $BaCO_3$ and $Y_2O_3$ were also observed depending on the composition ratio.

All the hydrocarbon reforming catalysts of Examples 1 to 16 contain a Ru component, but a diffraction line due to ruthenium oxide or elemental ruthenium was not observed.

Figure 2:
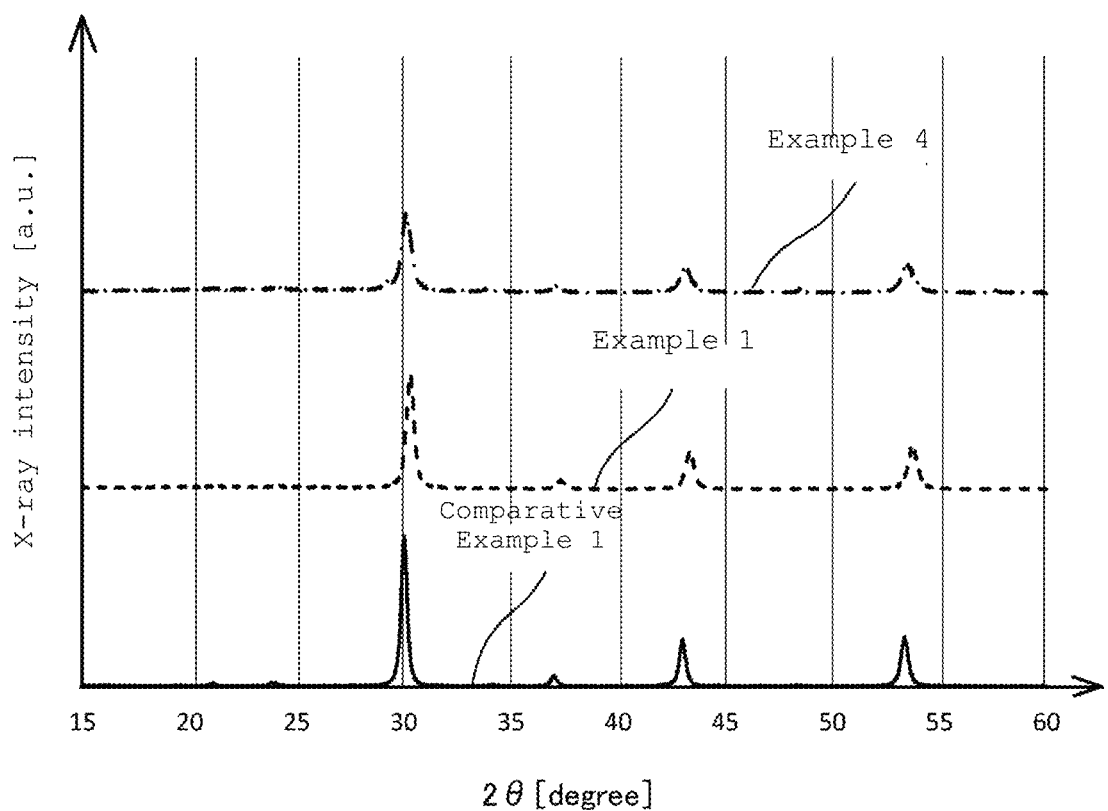
FIG. 2 shows X-ray diffraction patterns of the hydrocarbon reforming catalysts of Example 1, Example 4, and Comparative Example 1.

FIG. 2 shows X-ray diffraction patterns of the hydrocarbon reforming catalysts of Example 1, Example 4, and Comparative Example 1.

The hydrocarbon reforming catalyst of Comparative Example 1 contains a compound synthesized only from Ba and Zr components and the X-ray diffraction pattern coincides with an X-ray diffraction pattern of $BaZrO_3$, which is a complex oxide having a perovskite structure.

The hydrocarbon reforming catalyst of Example 1 contains a complex oxide synthesized from Ba, Zr, and Ru components, and shows an X-ray diffraction pattern of a perovskite structure. The position (2θ) of the diffraction line of the hydrocarbon reforming catalyst of Example 1 is located on a higher angle side than the position of the diffraction line of the hydrocarbon reforming catalyst of Comparative Example 1. A compound containing Ru other than the perovskite phase was not observed, and a change in lattice constant with the introduction of Ru was observed for the hydrocarbon reforming catalyst of Comparative Example 1. Therefore, Ru exists as a component contained in the complex oxide having a perovskite structure in the hydrocarbon reforming catalyst of Example 1. Similarly, Ru exists as a component contained in a complex oxide having a perovskite structure in the hydrocarbon reforming catalysts of Examples 2 to 16.

That is, the hydrocarbon reforming catalysts of Examples 1 to 16 satisfy the requirement of the present invention that the hydrocarbon reforming catalysts contain a complex oxide having a perovskite structure including at least Ba, Zr, and Ru.

The hydrocarbon reforming catalyst of Example 4 contains a complex oxide synthesized from Ba, Zr, Y, and Ru components, and shows an X-ray diffraction pattern of a perovskite structure. The position (2θ) of the diffraction line of the hydrocarbon reforming catalyst of Example 4 is located on a lower angle side than the position of the diffraction line of the hydrocarbon reforming catalyst of Example 1. Moreover, although the presence of a small amount of $Y_2O_3$ phase was observed by X-ray diffraction, the presence of a compound containing Y other than the $Y_2O_3$ phase was not observed, and a change in lattice constant with the introduction of Y was observed. Therefore, Y exists as a component contained in a complex oxide having a perovskite structure in the hydrocarbon reforming catalyst of Example 4. Similarly, as for the hydrocarbon reforming catalysts of Examples 2, 3, 5 to 11, 15, and 16, Y exists as a component contained in a complex oxide having a perovskite structure.

<Evaluation Test of Reforming>

Each of the hydrocarbon reforming catalysts of Examples 1 to 16 and Comparative Examples 1 to 6 was pulverized and classified to have a size of 0.5 mm to 0.7 mm, and then an evaluation test of steam reforming of the propane gas was performed by the following method.

A pipe 1 of a hydrocarbon reforming apparatus 100 shown in FIG. 1 was filled with 0.3 g of the hydrocarbon reforming catalyst produced by the method described above, and the hydrocarbon reforming catalyst was heated at 600° C. by a heating section 2. Then, a gas to be treated was introduced from a gas supply pipe 4 at a flow rate of 450 cc/min. The gas to be treated contains nitrogen ($N_2$), propane ($C_3H_8$), and water vapor ($H_2O$), and the flow rates are 100 cc/min for nitrogen ($N_2$), 50 cc/min for propane ($C_3H_8$), and 300 cc/min for water vapor ($H_2O$).

The gas to be treated introduced into the pipe 1 is reformed, and a synthesis gas containing hydrogen and carbon monoxide is discharged from a gas discharge pipe 5. Water was removed from the synthesis gas discharged from the gas discharge pipe 5 with a cooling trap, and then the synthesis gas was introduced into a gas analyzer (gas chromatograph) to measure the hydrogen gas concentration.

Here, a state in which there was no sulfur component was maintained for 1 hour after the introduction of the gas to be treated, the hydrogen gas concentration was measured 1 hour after the introduction, and activity of the hydrocarbon reforming catalyst was examined. Then, the activity of the hydrocarbon reforming catalyst was examined after another 1 hour and 5 hours after the introduction of the sulfur component into the pipe 1. Here, $SO_2$ was introduced as the sulfur component so that the $SO_2$ concentration in the gas to be treated was 10 ppm. However, the sulfur component is not limited to $SO_2$.

Table 2 shows the hydrogen gas concentration after 1 hour in the absence of $SO_2$, the hydrogen gas concentration after 1 hour in the presence of $SO_2$, the hydrogen gas concentration after 5 hours in the presence of $SO_2$, and the hydrogen concentration decrease rate, which indicates the degree of decrease in the hydrogen gas concentration when $SO_2$ is present (after 1 hour) compared to when $SO_2$ is absent for the cases where the hydrocarbon reforming catalysts of Examples 1 to 16 and Comparative Examples 1 to 6 were used.

TABLE 2

| Catalyst | Hydrogen gas concentration after catalytic reaction [vol %] | | | Hydrogen concentration decrease rate |
| --- | --- | --- | --- | --- |
| | After 1 hour, in absence of $SO_2$ | After 1 hour, in presence of $SO_2$ | After 5 hours, in presence of $SO_2$ | Comparison with after 1 hour, in presence of $SO_2$ |
| Example 1 | 43 | 32 | 0 | 26% |
| Example 2 | 43 | 36 | 0 | 16% |
| Example 3 | 44 | 42 | 40 | 5% |
| Example 4 | 44 | 43 | 41 | 2% |
| Example 5 | 43 | 39 | 33 | 9% |
| Example 6 | 42 | 35 | 25 | 17% |
| Example 7 | 23 | 22 | 22 | 4% |
| Example 8 | 36 | 35 | 34 | 3% |
| Example 9 | 44 | 44 | 43 | 0% |
| Example 10 | 44 | 44 | 44 | 0% |
| Example 11 | 44 | 44 | 44 | 0% |
| Example 12 | 42 | 27 | 0 | 36% |

TABLE 2-continued

| Catalyst | Hydrogen gas concentration after catalytic reaction [vol %] | | | Hydrogen concentration decrease rate |
|---|---|---|---|---|
| | After 1 hour, in absence of SO$_2$ | After 1 hour, in presence of SO$_2$ | After 5 hours, in presence of SO$_2$ | Comparison with after 1 hour, in presence of SO$_2$ |
| Example 13 | 44 | 30 | 0 | 32% |
| Example 14 | 44 | 33 | 0 | 25% |
| Example 15 | 41 | 38 | 35 | 7% |
| Example 16 | 43 | 42 | 39 | 2% |
| Comparative Example 1 | 0 | 0 | 0 | — |
| Comparative Example 2 | 5 | 0 | 0 | 100% |
| Comparative Example 3 | 6 | 1 | 0 | 83% |
| Comparative Example 4 | 18 | 0 | 0 | 100% |
| Comparative Example 5 | 28 | 5 | 0 | 82% |
| Comparative Example 6 | 20 | 3 | 0 | 85% |

The hydrogen concentration decrease rate is 0% when the hydrogen gas concentration measured in the absence of SO$_2$ and the hydrogen gas concentration after 1 hour in the presence of SO$_2$ are equal, and the hydrogen concentration decrease rate is 100% when the hydrogen gas concentration after 1 hour in the presence of SO$_2$ is 0 vol %.

After the test, in order to confirm the presence or absence of carbon deposition, the hydrocarbon reforming catalyst was cooled and taken out in a N$_2$ atmosphere, and the weight change of the catalyst due to carbon combustion was examined by thermogravimetric differential thermal analysis (TG-DTA). However, carbon deposition was not observed in any of the hydrocarbon reforming catalysts of Examples 1 to 16 and Comparative Examples 1 to 6 subjected to the evaluation.

<Improvement in Initial Activity>

When the hydrocarbon reforming catalysts of Examples 1 to 16 satisfying the requirements of the present invention were used, the hydrogen gas concentrations after 1 hour in the absence of SO$_2$ (hereinafter referred to as the initial activity hydrogen gas concentration) of all of the hydrocarbon reforming catalysts were high. More specifically, the initial activity hydrogen gas concentrations in the cases where the hydrocarbon reforming catalysts of Examples 1 to 16 were used are higher than that in the case where the hydrocarbon reforming catalyst of Comparative Example 4 corresponding to the catalyst described in Patent Document 4 described above was used. It is considered that this is because the stabilization of the Ru component by solid solution and dispersion in the complex oxide having a perovskite structure makes it possible to suppress aggregation and volatilization of the Ru component under high temperature oxidation conditions and thus improves the activity of the catalyst.

On the other hand, when the hydrocarbon reforming catalyst of Comparative Example 1 that did not contain the Ru component was used, a reforming reaction did not proceed and the initial activity hydrogen gas concentration was 0 vol %.

Furthermore, although the hydrocarbon reforming catalyst of Comparative Example 2 contains Ba, Zr, and Ru in the same proportion as the hydrocarbon reforming catalyst of Example 1, the individual elements remain in the form of a mixture of oxides or carbon salts, and a complex oxide having a perovskite structure is not formed. Therefore, the Ru dispersion effect was low, and the initial activity hydrogen gas concentration was about 89% lower than in the case of Example 1.

Although the hydrocarbon reforming catalyst of Comparative Example 3 contains Ba, Zr, Y, and Ru in the same proportion as the hydrocarbon reforming catalyst of Example 4, the individual elements remain in the form of a mixture of oxides or carbon salts, and a complex oxide having a perovskite structure is not formed. Therefore, the Ru dispersion effect was low, and the initial activity hydrogen gas concentration was about 86% lower than in the case of Example 4.

As for the hydrocarbon reforming catalyst of Comparative Example 4, contains the a complex oxide having a perovskite structure including Ba, Zr, Y, and Ni is contained, and Ru is not included in the perovskite structure. As shown in Table 2, the initial activity hydrogen gas concentration of the hydrocarbon reforming catalyst of Comparative Example 4 was lower as compared with those of Examples 1 to 16.

The hydrocarbon reforming catalyst of Comparative Example 5 is a catalyst in which ruthenium is supported on alumina serving as a substrate, and is produced by an impregnation method. Since a complex oxide having a perovskite structure including Ru was not synthesized in the hydrocarbon reforming catalyst of Comparative Example 5, the Ru dispersion effect was low, and the initial activity hydrogen gas concentration was lower than those of the Examples.

The initial activity hydrogen gas concentration in the case where the hydrocarbon reforming catalyst of Comparative Example 5 was used is higher than that in the case where the hydrocarbon reforming catalyst of Example 7 was used. However, the hydrocarbon reforming catalyst of Comparative Example 5 was produced by the impregnation method as described above, and an impregnation step of supporting a metal component is required in addition to a step of synthesizing the support component. On the other hand, the hydrocarbon reforming catalysts of Examples 1 to 16 do not require the impregnation step for supporting the metal component on the support in the production process. Here, the hydrocarbon reforming catalyst of Comparative Example 5 is described as an example of a catalyst produced by the impregnation method.

The hydrocarbon reforming catalyst of Comparative Example 6 was obtained by further heat-treating the hydrocarbon reforming catalyst of Comparative Example 5 in air at 1000° C. for 1 hour, and the initial activity hydrogen gas concentration was lower than that of Comparative Example 5. On the other hand, the hydrocarbon reforming catalysts of Examples 1 to 16 have high initial activity hydrogen gas concentrations even though the hydrocarbon reforming catalysts were fired at 1000° C. during production; thus, the hydrocarbon reforming catalysts have excellent durability at a high temperature.

Here, among Examples 1 to 16, in Examples 7 and 8 in which the molar ratio of Ru to Ba was less than 0.07, the initial activity hydrogen gas concentration was 36% or less, whereas in Examples 1 to 6 and 9 to 16 in which the molar ratio of Ru to Ba was 0.07 or more, the initial activity hydrogen gas concentration was 41% or more. Therefore, the molar ratio of Ru to Ba is preferably 0.07 or more.

In all of Examples 1 to 16, the molar ratio of Ru to Ba is 0.41 or less.

<Improvement in Durability Against Sulfur>

As shown in Table 2, when the hydrocarbon reforming catalysts of Comparative Examples 2 to 6 that did not satisfy the requirements of the present invention were used, the hydrogen concentration decrease rates in the presence of the sulfur component were as high as 82% or more.

On the other hand, when the hydrocarbon reforming catalysts of Examples 1 to 16 that satisfied the requirements of the present invention were used, the hydrogen concentration decrease rates in the presence of the sulfur component were as low as 36% or less. It is considered that this is because the Ru component included in the perovskite structure has a strong binding force to suppress the adsorption of the sulfur component and the formation of a compound.

In particular, the hydrogen concentration decrease rates in the cases where the hydrocarbon reforming catalysts of Examples 2 to 11, 15, and 16 containing a complex oxide having a perovskite structure including Ba, Zr, Y, and Ru were used were lower than those in the cases where the hydrocarbon reforming catalysts of Examples 1 and 12 to 14 that did not contain the Y component were used. That is, the hydrogen concentration decrease rates were 25% or more in Examples 1 and 12 to 14, whereas the hydrogen concentration decrease rates were 17% or less in Examples 2 to 11, 15, and 16.

That is, among the hydrocarbon reforming catalysts of Examples 1 to 16 that satisfy the requirements of the present invention, the hydrocarbon reforming catalysts of Examples 2 to 11, 15 and 16 that further include a Y component in the perovskite structure have high durability against the sulfur component, and the concentration of hydrogen contained in the synthesis gas obtained by the reforming is high even when the sulfur component is present.

The hydrocarbon reforming catalysts of Examples 2 to 6 and 15 contain Ru in the same molar ratio as the hydrocarbon reforming catalyst of Example 1, and differ in that the Y component is further included in the perovskite structure. The hydrogen concentration decrease rate was 26% in Example 1, whereas the hydrogen concentration decrease rate was 17% or less in Examples 2 to 6 and 15.

Furthermore, the hydrocarbon reforming catalysts of Examples 7, 10, and 11 contain Ru in the same molar ratio as the hydrocarbon reforming catalysts of Examples 12, 13, and 14, and differ in that the Y component is further included in the perovskite structure. The hydrogen concentration decrease rates were 0% to 4% in Examples 7, 10, and 11, whereas the hydrogen concentration decrease rates were 25% to 36% in Examples 12 to 14.

That is, when the molar ratio of Ru contained is the same, it is preferable that the perovskite structure of the complex oxide contained in the catalyst further include the Y component.

As shown in Table 1, as for the hydrocarbon reforming catalysts of Examples 2 to 11, 15, and 16 containing Y in addition to Ba, Zr and Ru as the elements included in the perovskite structure, the molar ratio of Y to Ba is 0.1 to 0.5. Furthermore, the molar ratio of Y to Zr is 0.1 to 1. Furthermore, the molar ratio of the total amount of Zr and Y to Ba is 0.68 to 1.5.

Here, the hydrocarbon reforming catalysts of Examples 2 to 6 contain a complex oxide having a perovskite structure including Ba, Zr, Y and Ru, the molar ratio of Ru is the same, and the molar ratio of Y is different within a range in which the molar ratio of the total amount of Zr and Y to Ba is 1. As shown in Table 2, the hydrocarbon reforming catalysts of Examples 3 to 5 in which the molar ratio of Y to Ba is in a range of 0.2 to 0.4 are preferable because the hydrogen concentration decrease rates are 9% or less.

Furthermore, among the hydrocarbon reforming catalysts of Examples 1 to 16 that satisfy the requirements of the present invention, the hydrocarbon reforming catalysts of Examples 3 to 5, 7 to 11, 15 and 16 that contain a complex oxide having a perovskite structure including Ba, Zr, Y, and Ru, and in which the molar ratio of Y to Zr is 0.25 to 0.67 are more preferable because the hydrogen concentration decrease rates are 9% or less.

The hydrocarbon reforming catalysts of Examples 4 and 9 to 11 contain the complex oxide having a perovskite structure including Ba, Zr, Y and Ru, have the same molar ratio of Ba:Zr:Y of 1.0:0.7:0.3, and a different molar ratio of Ru. As shown in Table 2, the hydrocarbon reforming catalysts of Examples 9 to 11 in which the molar ratio of Ru to Ba is 0.12 or more are more preferable than the hydrocarbon reforming catalyst of Example 4 in which the molar ratio of Ru to Ba is 0.08 because the hydrogen concentration decrease rate is 0%.

The present invention is not limited to the above embodiment, and various applications and modifications can be added within the scope of the present invention.

DESCRIPTION OF REFERENCE SYMBOLS

1: Pipe
2: Heating section
3: Hydrocarbon reforming catalyst
4: Gas supply pipe
5: Gas discharge pipe
6: Hydrocarbon supply source
7: Hydrogen extraction outlet
100: Hydrocarbon reforming apparatus

The invention claimed is:

1. A hydrocarbon reforming catalyst for producing a synthesis gas containing hydrogen and carbon monoxide from a hydrocarbon-based gas, the hydrocarbon reforming catalyst comprising:
a complex oxide having a perovskite structure including at least Ba, Zr, Ru, and Y,
wherein a molar ratio of Y to Ba is 0.1 to 0.5.

2. The hydrocarbon reforming catalyst according to claim 1, wherein a molar ratio of the Ru to the Ba is 0.07 or more.

3. The hydrocarbon reforming catalyst according to claim 2, wherein the molar ratio of the Ru to the Ba is 0.07 to 0.41.

4. The hydrocarbon reforming catalyst according to claim 1, wherein a molar ratio of the Y to the Ba is 0.2 to 0.4.

5. The hydrocarbon reforming catalyst according to claim 1, wherein a molar ratio of the Y to the Zr is 0.1 or more.

6. The hydrocarbon reforming catalyst according to claim 5, wherein the molar ratio of the Y to the Zr is 0.1 to 1.

7. The hydrocarbon reforming catalyst according to claim 1, wherein a molar ratio of the Y to the Zr is 0.25 to 0.67.

8. The hydrocarbon reforming catalyst according to claim 1, wherein a molar ratio of a total amount of the Zr and the Y to the Ba is 0.68 to 1.5.

9. The hydrocarbon reforming catalyst according to claim 1, wherein a molar ratio of the Y to the Zr is 0.1 to 1, and a molar ratio of a total amount of the Zr and the Y to the Ba is 0.68 to 1.5.

10. A hydrocarbon reforming apparatus for treating a gas containing at least a hydrocarbon, the apparatus comprising:
    a pipe configured such that the gas containing the at least the hydrocarbon can flow;
    a heater positioned to heat the gas as the gas flows through the pipe; and
    a hydrocarbon-reforming catalyst disposed so as to contact the gas while the gas is inside the pipe, the hydrocarbon-reforming catalyst containing a complex oxide having a perovskite structure including at least Ba, Zr, Ru, and Y, wherein a molar ratio of Y to Ba is 0.1 to 0.5.

11. The hydrocarbon reforming apparatus according to claim 10, wherein a molar ratio of the Ru to the Ba is 0.07 to 0.41.

12. The hydrocarbon reforming apparatus according to claim 10, wherein the molar ratio of the Y to the Zr is 0.1 to 1.

13. The hydrocarbon reforming apparatus according to claim 10, wherein a molar ratio of the Y to the Zr is 0.1 to 1, and a molar ratio of a total amount of the Zr and the Y to the Ba is 0.68 to 1.5.

14. The hydrocarbon reforming apparatus according to claim 10, further comprising a hydrocarbon supply source that is disposed on an upstream side of the pipe and is constructed to supply the hydrocarbon.

15. The hydrocarbon reforming apparatus according to claim 10, further comprising a hydrogen extraction outlet disposed on a downstream side of the pipe.

* * * * *